(12) United States Patent
Kirita

(10) Patent No.: US 10,663,561 B2
(45) Date of Patent: May 26, 2020

(54) RADAR SIGNAL PROCESSING DEVICE

(71) Applicant: Mitsubishi Electric Corporation, Tokyo (JP)

(72) Inventor: Mitsuru Kirita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 280 days.

(21) Appl. No.: 15/796,119

(22) Filed: Oct. 27, 2017

(65) Prior Publication Data

US 2018/0341006 A1 Nov. 29, 2018

(30) Foreign Application Priority Data

May 24, 2017 (JP) .................................. 2017-102691

(51) Int. Cl.
*G01S 7/35* (2006.01)
*G01S 7/41* (2006.01)
(Continued)

(52) U.S. Cl.
CPC ............... *G01S 7/354* (2013.01); *G01S 7/411* (2013.01); *G01S 7/414* (2013.01); *G01S 13/42* (2013.01); *G06K 9/3241* (2013.01)

(58) Field of Classification Search
CPC ...... G01S 7/2813; G01S 13/53; G01S 13/726; G01S 7/292; G01S 13/426; G01S 13/282;
(Continued)

(56) References Cited

U.S. PATENT DOCUMENTS 4,742,353 A * 5/1988 D'Addio ............. G01S 13/5244
342/159
6,738,563 B1 * 5/2004 Hager ..................... G01S 7/292
342/147
(Continued)

FOREIGN PATENT DOCUMENTS

EP 1837804 A1 * 9/2007 ......... G06K 9/00791
JP 45-13150 A 5/1970
(Continued)

OTHER PUBLICATIONS

Communication dated Mar. 27, 2018 from the Japanese Patent Office in counterpart application No. 2017-102691.

*Primary Examiner* — Olumide Ajibade Akonai
(74) *Attorney, Agent, or Firm* — Sughrue Mion PLLC; Richard C. Turner

(57) ABSTRACT

The radar signal processing device includes: a transmitter; a receiver configured to acquire a received signal based on a reflected wave received from the object; a detector unit configured to detect information to be used for type determination of the object from the received signal; an object determination unit configured to determine a type of the object; and a control unit configured to identify a weighting factor set for each piece of the information to be used for the type determination of the object based on a characteristic of the received signal. The object determination unit is configured to obtain a total sum value by multiplying the corresponding weighting factor identified by the control unit for each piece of the information detected by the detector unit, and to determine the type of the object based on the total sum value.

10 Claims, 9 Drawing Sheets

(51) Int. Cl.
*G01S 13/42* (2006.01)
*G06K 9/32* (2006.01)

(58) Field of Classification Search
CPC .. G01S 13/86; G01S 2013/0245; G01S 13/42; G01S 7/354; G01S 7/411; G01S 7/414; G01S 13/34; G01S 13/584; G01S 13/931; G01S 2013/9375; G01S 7/412; G01S 17/89; G06K 9/00818; G06K 9/00825; G06K 9/3241; G05D 1/0257; H04L 47/12; B60R 21/013
See application file for complete search history.

(56) References Cited

U.S. PATENT DOCUMENTS

| | | | | |
|---|---|---|---|---|
| 7,492,313 | B1* | 2/2009 | Ehret | G01S 7/032 342/158 |
| 7,535,410 | B2* | 5/2009 | Suzuki | G01S 7/2813 342/159 |
| 7,876,261 | B1* | 1/2011 | Adams | G01S 7/282 342/165 |
| 2005/0046597 | A1* | 3/2005 | Hutchison | G01S 13/92 340/917 |
| 2006/0220950 | A1* | 10/2006 | Morgan | G01R 29/105 342/165 |
| 2015/0098076 | A1* | 4/2015 | Oh | G01S 7/4808 356/4.01 |
| 2015/0247914 | A1* | 9/2015 | Rothacher | G01S 13/103 701/301 |
| 2016/0077195 | A1* | 3/2016 | Chang | G01S 7/42 342/194 |
| 2017/0364775 | A1* | 12/2017 | Mori | G06K 9/00805 |

FOREIGN PATENT DOCUMENTS

| | | |
|---|---|---|
| JP | 9-145834 A | 6/1997 |
| JP | 10-268047 A | 10/1998 |
| WO | 2016/194036 A1 | 12/2016 |

* cited by examiner

RADAR SIGNAL PROCESSING DEVICE

BACKGROUND OF THE INVENTION

1. Field of the Invention

The present invention relates to a radar signal processing device configured to conduct type determination of an object.

2. Description of the Related Art

There is a related-art radar signal processing device including a primary feature amount extraction unit, a data storage processing unit, a secondary feature amount extraction unit, a belonging degree calculation unit, and an object determination unit, which have the following functions (see, for example, Japanese Patent No. 5908193).

The primary feature amount extraction unit is configured to extract information relating to a relative distance and a relative velocity of an own device relative to each of a plurality of objects and an direction and a reflection intensity of each of the plurality of objects from a received signal of a radar as a primary feature amount on a fixed time cycle. The data storage processing unit is configured to store the primary feature amount, and to associate a plurality of primary feature amounts to one another as information on the same object over a plurality of cycles in time series.

The secondary feature amount extraction unit is configured to extract a secondary feature amount including a received power for each distance and a change amount of the received power from the primary feature amount stored in the data storage processing unit. The belonging degree calculation unit is configured to calculate a belonging degree with respect to a distribution of the secondary feature amounts in relation to a category defined in advance, which includes a vehicle, a pedestrian, and a low-position object, for each of the secondary feature amounts.

Then, the object determination unit is configured to determine the category of the object based on a total sum value obtained by multiplying the belonging degree of each secondary feature amount by a weighting factor corresponding to each secondary feature amount for each category (type).

However, the related art involves the following problem.

The related-art radar signal processing device described above is configured to determine the type of the object by setting, as a feature amount, a change amount of the reflection intensity of the object acquired by the radar in terms of time and distance.

Therefore, the related-art radar signal processing device involves a fear that the reflection intensity in terms of time and distance may vary due to an influence of noise to a greater degree than intrinsic variations of the signal ascribable to the object when the object is located at a distant place or is moving away from a beam in the immediate vicinity. As a result, a change occurs in a variation amount of the reflection intensity in terms of time and distance, which leads to a problem that the type of the object is determined as a type different from an actual type of the object.

SUMMARY OF THE INVENTION

The present invention has been made in order to solve the above-mentioned problem, and has an object to obtain a radar signal processing device capable of conducting type determination of an object more accurately than a related-art radar signal processing device.

According to one embodiment of the present invention, there is provided an radar signal processing device including: a transmitter configured to transmit a transmission wave to an object; a receiver configured to acquire a received signal based on a reflected wave from the object; a detector unit configured to detect information to be used for type determination of the object from the received signal acquired by the receiver; an object determination unit configured to determine a type of the object based on the information detected by the detector unit; and a control unit configured to identify a weighting factor set for each piece of the information to be used for the type determination of the object based on a characteristic of the received signal acquired by the receiver, in which the object determination unit is configured to obtain a total sum value by multiplying the corresponding weighting factor identified by the control unit for each piece of the information detected by the detector unit, and to determine the type of the object based on the total sum value.

According to the present invention, there is provided a configuration capable of obtaining the weighting factor appropriate for the received signal for each piece of information to be used for the type determination, and obtaining the total sum value in consideration of the weighting factor for each piece of information, and conducting the type determination of the object based on the total sum value. As a result, it is possible to obtain the radar signal processing device capable of conducting the type determination of the object more accurately than the related-art radar signal processing device.

DESCRIPTION OF THE EMBODIMENTS

With reference to the accompanying drawings, a radar signal processing device according to exemplary embodiments of the present invention is described below.

First Embodiment

Figure 1:
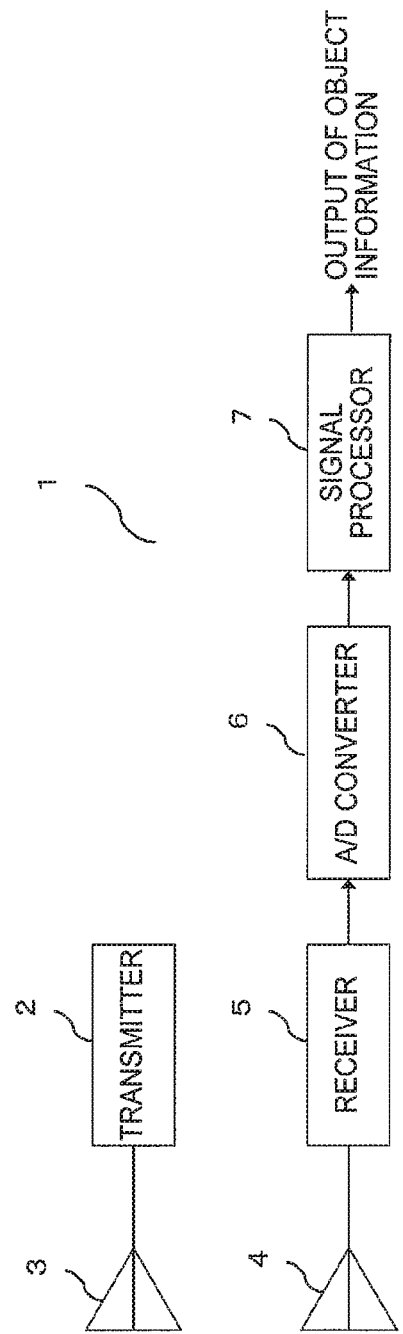
FIG. 1 is a block diagram of a radar signal processing device according to a first embodiment of the present invention.

FIG. 1 is a block diagram of a radar signal processing device 1 according to a first embodiment of the present invention. As illustrated in FIG. 1, the radar signal processing device 1 according to the first embodiment includes a transmitter 2, a transmission antenna 3, a receiving antenna 4, a receiver 5, an A/D converter 6, and a signal processor 7, and is configured to finally output object information. The first embodiment is described by taking an example in which the radar signal processing device 1 is formed based on a frequency modulation continuous wave (FMCW) radar system.

Now, operations of respective components illustrated in the block diagram of FIG. 1 are described below in detail.

The transmitter 2 is configured to oscillate and amplify a transmission signal having a predetermined frequency, and to input the transmission signal to the transmission antenna 3. The transmission antenna 3 is configured to convert the transmission signal input from the transmitter 2 into a radio wave (hereinafter referred to as "transmission wave"), and to emit the transmission wave to space.

The receiving antenna 4 is configured to receive a radio wave (hereinafter referred to as "reflected wave") obtained after the transmission wave is reflected by an object (not shown). The receiving antenna 4 is further configured to convert the received reflected wave into a received signal, and to input the received signal to the receiver 5.

For the sake of convenience, one transmission antenna 3 and one receiving antenna 4 are illustrated in FIG. 1. However, each of the number of transmission antennas 3 and the number of receiving antennas 4 is not limited to one, and may be any number.

The receiver 5 is configured to amplify the received signal input from the receiving antenna 4, and to then mix the received signal with a reference signal (not shown) or the transmission signal (not shown) distributed from the transmitter 2 (frequency conversion), to thereby generate a beat signal of the received signal. The receiver 5 is configured to finally input the beat signal, from which an unnecessary signal component has been removed by a filter, to the A/D converter 6.

The A/D converter 6 is configured to sample the beat signal (analog signal) input from the receiver 5, to convert the beat signal into a digital signal, and to input the digital signal to the signal processor 7.

Figure 2:
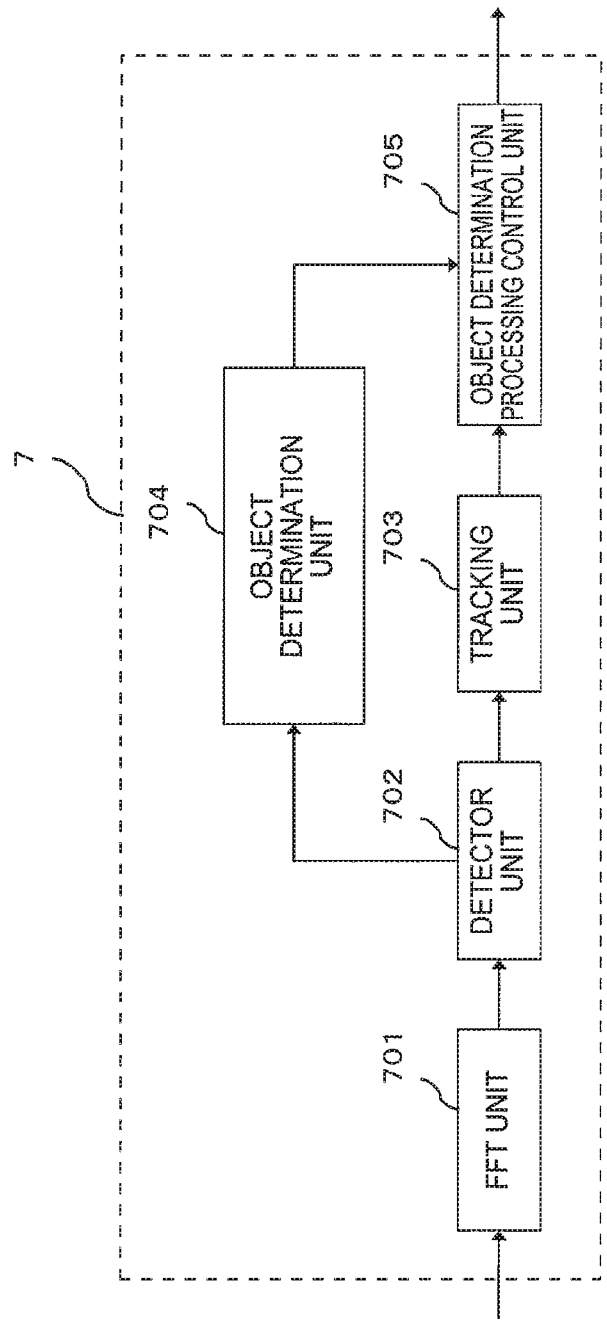
FIG. 2 is an internal configuration diagram of a signal processor within the radar signal processing device according to the first embodiment of the present invention.

FIG. 2 is an internal configuration diagram of the signal processor 7 within the radar signal processing device 1 according to the first embodiment of the present invention. The signal processor 7 of the first embodiment has an internal configuration illustrated in FIG. 2. Operations of respective components are described below.

An FFT unit 701 is configured to perform fast Fourier transform (FFT) on the digital signal input from the A/D converter 6, and to generate a frequency power spectrum.

Figure 3:
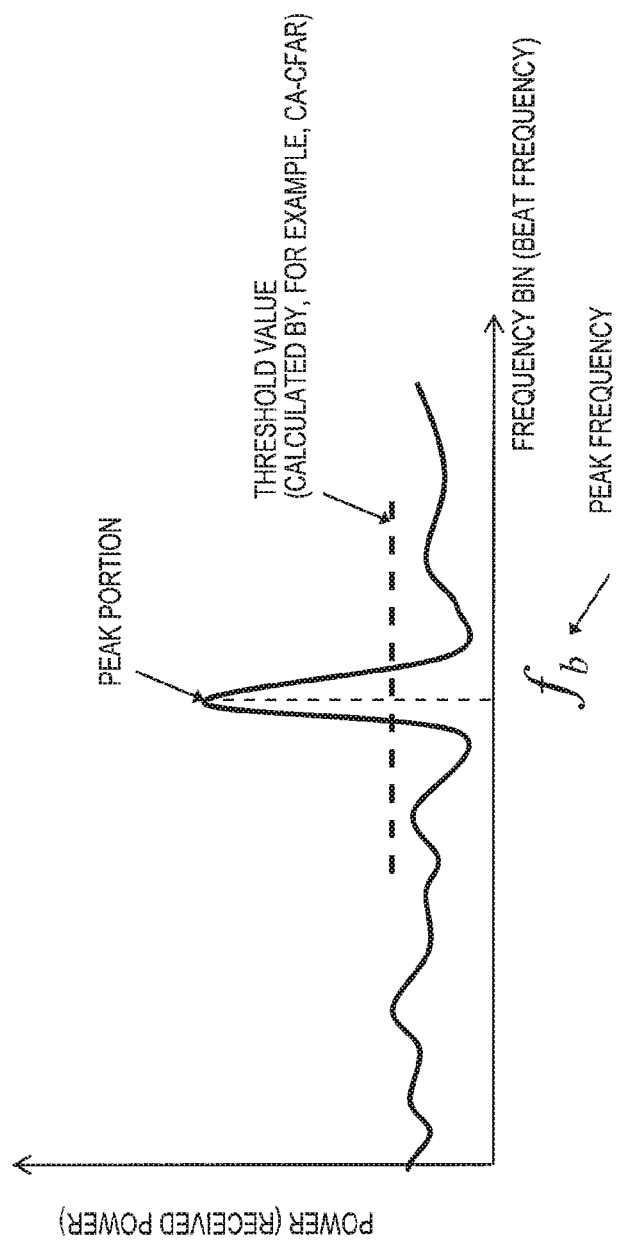
FIG. 3 is an explanatory graph for showing a method of detecting a peak portion from a frequency power spectrum by a detector unit of the first embodiment of the present invention.

A detector unit 702 is configured to detect a peak portion from the frequency power spectrum. FIG. 3 is an explanatory graph for showing a method of detecting the peak portion from the frequency power spectrum by the detector unit 702 of the first embodiment of the present invention. The detector unit 702 detects the peak portion by a method of, for example, extracting a frequency bin exhibiting a power that is a local maximum and larger than a threshold value set in advance from the frequency power spectrum.

The power and the frequency bin of the peak portion detected from the frequency power spectrum correspond to a received power (including phase component as well) and a beat frequency, respectively, of the reflected wave received from the object. Therefore, the detector unit 702 can obtain a relative distance, a relative velocity, and a measured angle value, which are included in object motion/location information, from the received power and the beat frequency of the detected peak portion.

The above-mentioned threshold value may be set by using, for example, cell average constant false alarm rate (CA-CFAR), which is a known method.

The detector unit 702 can also combine the digital signals received from a plurality of receiving antennas 4 by digital beam forming (DBF), to thereby be able to change a detection range of the object in an angular direction. Therefore, the detector unit 702 sets DBF combination so that the received power of the detected peak portion has a local maximum value, to thereby be able to further increase detection accuracy of the peak portion.

A tracking unit 703 is configured to track the object based on the object motion/location information obtained by the detector unit 702 by observation of the location of the object, smoothing processing, and prediction processing for obtaining information on the subsequent location.

An object determination processing control unit 704 is configured to control determination processing of an object determination unit 705 being post-processing based on the received power obtained from the detector unit 702. Contents of processing conducted by the object determination processing control unit 704 are described later.

The object determination unit 705 is configured to determine a type of the object based on the relative distance and the relative velocity relative to the object and the measured angle value and the received power, which have been obtained by the detector unit 702. The present invention can be applied to a radar signal processing device configured to determine the type of the object based on the received signal, and can be applied to, for example, the above-mentioned related-art technology and a weather radar configured to detect rain, snow, hail, or lightning based on the received power of the received signal and a change in Doppler velocity thereof and to determine the type.

Figure 4:
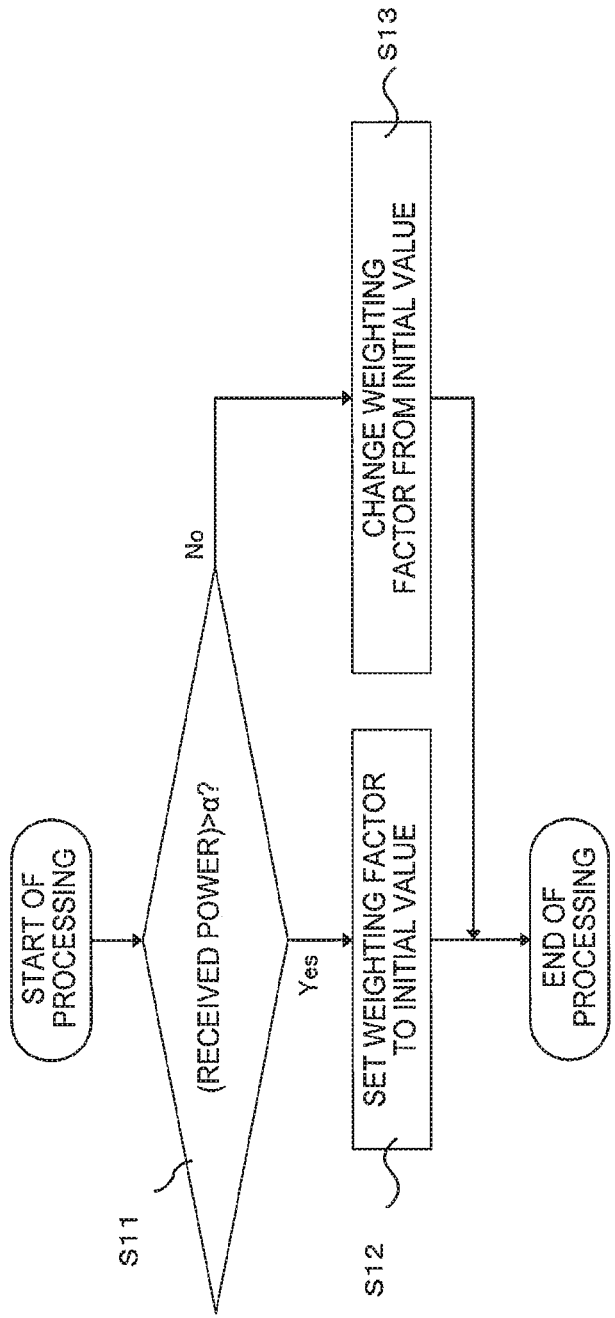
FIG. 4 is a flowchart for illustrating a series of operations conducted by an object determination processing control unit of the first embodiment of the present invention.

Next, the contents of the processing conducted by the object determination processing control unit 704 of the first embodiment described above are described with reference to a flowchart. FIG. 4 is a flowchart for illustrating a series of operations conducted by the object determination processing control unit 704 of the first embodiment of the present invention.

First, in Step S11, the object determination processing control unit 704 determines whether or not the received power detected by the detector unit 702 is larger than a threshold value α set in advance.

When the received power is larger than the threshold value α (YES in FIG. 4), the object determination processing control unit 704 executes the processing of Step S12. Specifically, in Step S12, the object determination processing control unit 704 conducts processing for setting, to an initial value, a weighting factor to be multiplied by information to be used for type determination.

In this case, the initial value corresponds to a coefficient set in advance for each piece of information to be used for the type determination. The initial value of the weighting factor may be defined through an experiment or the like. Examples of the information to be used for the type determination include a maximum detection distance, the relative velocity, the received power, a change amount of the received power (in directions of distance and time), and wavenumber information on an arrival wave obtained by an arrival direction estimation method.

Meanwhile, when the received power is equal to or smaller than the threshold value α, the object determination processing control unit 704 executes the processing of Step S13. Then, in Step S13, the object determination processing control unit 704 conducts processing for changing, from the initial value, the weighting factor to be multiplied by the information to be used for the type determination.

After the object determination processing control unit 704 conducts the above-mentioned processing, the object determination unit 705 calculates, for each piece of information, a belonging degree with respect to a distribution of pieces of information to be used for the type determination of an object type, which is defined in advance, in relation to the information to be used for the type determination, which is obtained from the received signal of the reflected wave received from the object.

In addition, the object determination unit 705 determines the type (category) of the object based on a total sum value obtained by multiplying the calculated belonging degree by the weighting factor for each piece of information to be used for the type determination, which is set by the object determination processing control unit 704.

To be specific, in Step S13 described above, the following processing is conducted. For example, when the received power is equal to or smaller than the predetermined threshold value α, the object determination processing control unit 704 determines that the change amount (variations in terms of time and distance) of the received power, which is one of the pieces of information to be used for the type determination, is not the intrinsic variations of the signal ascribable to the object due to an influence of noise.

In view of this, the object determination processing control unit 704 reduces the weighting factor to be multiplied by the change amount (variations in terms of time and distance) of the received power from the initial value, and sets the initial value as the weighting factor to be multiplied by the other pieces of information to be used for the type determination.

The example of setting only one threshold value α is illustrated in the flowchart of FIG. 4, but a plurality of threshold values α may be set in a stepwise manner. For example, when the threshold value α is set large, a signal having a smaller received power is also to be used for the type determination.

Figure 5:
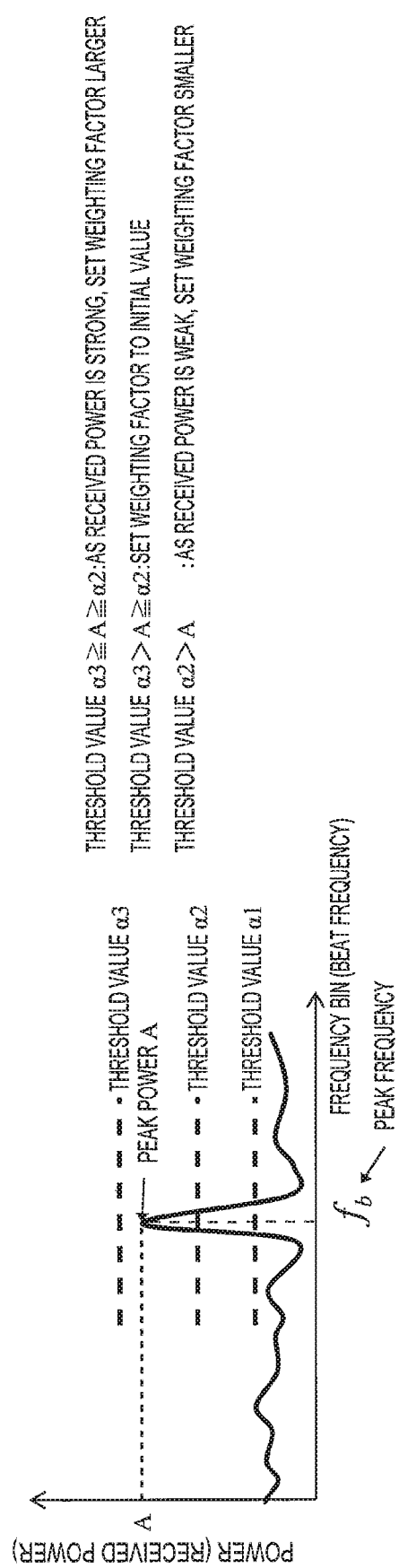
FIG. 5 is an explanatory graph for showing a method of detecting the peak portion from the frequency power spectrum through use of three threshold values by the detector unit of the first embodiment of the present invention.

FIG. 5 is an explanatory graph for showing a method of detecting the peak portion from the frequency power spectrum through use of three threshold values by the detector unit of the first embodiment of the present invention. As illustrated in FIG. 5, the weighting factor may be set in a stepwise manner based on the received power so as to lower the weighting factor when the influence of noise is strong (that is, when the received power is weak) to reduce an influence of the type determination on the belonging degree, and so as to raise the weighting factor when the influence of noise is weak (that is, the received power is strong) to increase the influence of the type determination on the belonging degree.

Such a procedure for determining the threshold value α and the weighting factor is merely an example. The weighting factor to be multiplied by the information to be used for the type determination and the threshold value α also depend on which types of and how many types of feature amounts are to be used for the type determination. Therefore, it is appropriate to determine the threshold value α and the weighting factor based on an analysis or an experiment using an actual radar device.

As described above, a radar signal processing device according to the first embodiment includes a detector unit, a tracking unit, an object determination processing control unit, and an object determination unit, and is configured to conduct the following processing through use of the above-mentioned components.

The detector unit is configured to detect the peak portion from the frequency power spectrum of the received signal reflected by the object, and to calculate the relative distance, the relative velocity, and the measured angle value, which relate to the object, from the received power and the beat frequency of the peak portion.

The tracking unit is configured to conduct tracking processing based on the relative distance, the relative velocity, and the measured angle value, which have been calculated by the detector unit. The object determination processing control unit is configured to variably set the weighting factor of each piece of information to be used for the type determination depending on a level of a signal intensity of the peak portion detected by the detector unit.

In addition, the object determination unit is configured to: calculate the belonging degree for each of the pieces of information to be used for the type determination, which are obtained from the received signal of the reflected wave received from the object; multiply the calculated belonging degree by the weighting factor variably set by the object determination processing control unit; and calculate the total sum value relating to all the pieces of information, to thereby determine the type (category) of the object.

That is, according to the first embodiment, there is provided a configuration capable of obtaining the belonging degree and the weighting factor appropriate for the received signal for each of the pieces of information to be used for the type determination, obtaining a total sum of values obtained by multiplying the belonging degree for each of the pieces of information by the weighting factor in relation to the information to be used for the type determination, and conducting the type determination of the object based on the total sum value. As a result, it is possible to obtain a radar signal processing device capable of conducting the type determination of the object more accurately than the related-art radar signal processing device.

Second Embodiment

A radar signal processing device 1 according to a second embodiment of the present invention has the same configuration as that illustrated in the block diagram of FIG. 1 of the first embodiment. The radar signal processing device 1 according to the second embodiment is different from the first embodiment in that the signal processor 7 has a different configuration, which is described specifically below with reference to the accompanying drawings. In the following description, like components are denoted by like reference numerals.

Figure 6:
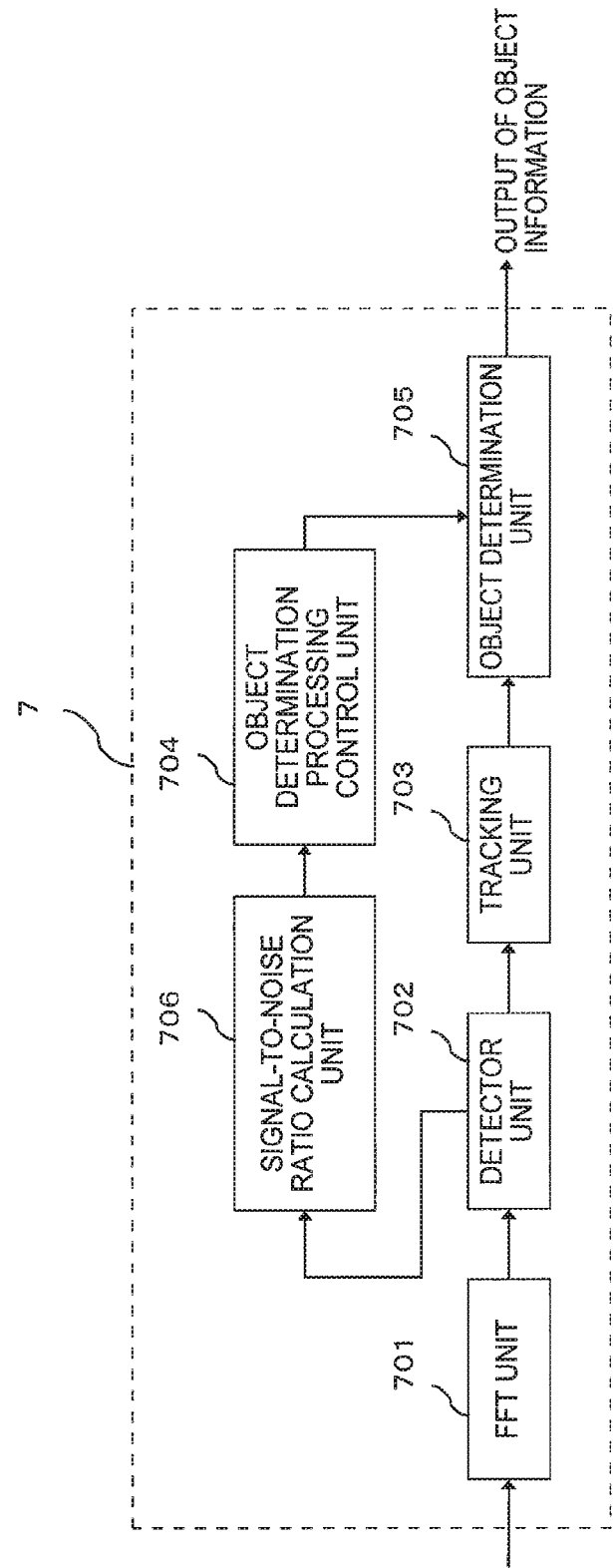
FIG. 6 is an internal configuration diagram of a signal processor within a radar signal processing device according to a second embodiment of the present invention.

FIG. 6 is an internal configuration diagram of the signal processor 7 within the radar signal processing device 1 according to the second embodiment of the present invention. The signal processor 7 of the second embodiment has the internal configuration illustrated in FIG. 6. The configuration of FIG. 6 is different from the configuration of FIG. 2 of the first embodiment in that a signal-to-noise ratio calculation unit 706 is further included between the detector unit 702 and the object determination processing control unit 704. Therefore, this different point is mainly described below.

The signal-to-noise ratio calculation unit 706 is configured to calculate a signal-to-noise ratio by setting, as the signal component, a received power (power) of the peak portion detected from the frequency power spectrum by the detector unit 702 and setting, as a noise component, an average of the received powers having a value equal to or smaller than the threshold value, which is set in advance, in several frequency bins adjacent to the beat frequency of the peak portion.

A method of determining the several adjacent frequency bins may be a method of using a fixed value defined through an experiment or the like. An average value of received powers over an entire frequency bin range of a frequency spectrum, an average value of received powers within all frequency bin ranges equal to or smaller than a threshold value set in advance, or a threshold value set by CA-CFAR may be employed as the noise component.

The signal-to-noise ratio calculation unit 706 can also detect the signal and the noise component with higher precision by conducting the combining by DBF. Specifically, the signal-to-noise ratio calculation unit 706 causes the detector unit 702 to combine the digital signals received from the plurality of receiving antennas 4 by digital beam forming (DBF).

With this configuration, the signal-to-noise ratio calculation unit 706 changes the detection range of the object in the angular direction, and sets the combining by DBF so that the signal component has the local maximum value and the noise component has a local minimum value, to thereby be able to detect the signal and the noise component with higher precision.

When there are a plurality of receiving antennas 4, the signal-to-noise ratio calculation unit 706 can also calculate the signal-to-noise ratio from a signal eigenvalue and a noise eigenvalue that are obtained from a correlation matrix of signals received by the respective receiving antennas 4. A method of obtaining the signal eigenvalue and the noise eigenvalue is described later.

The object determination processing control unit 704 is configured to control determination processing of the object determination unit 705 being post-processing based on the signal-to-noise ratio obtained from the detector unit 702.

Through use of the method described in the above-mentioned first embodiment, the object determination unit 705 determines a type of the object based on the relative distance and the relative velocity relative to the object and the measured angle value and the received power, which have been obtained by the detector unit 702.

Figure 7:
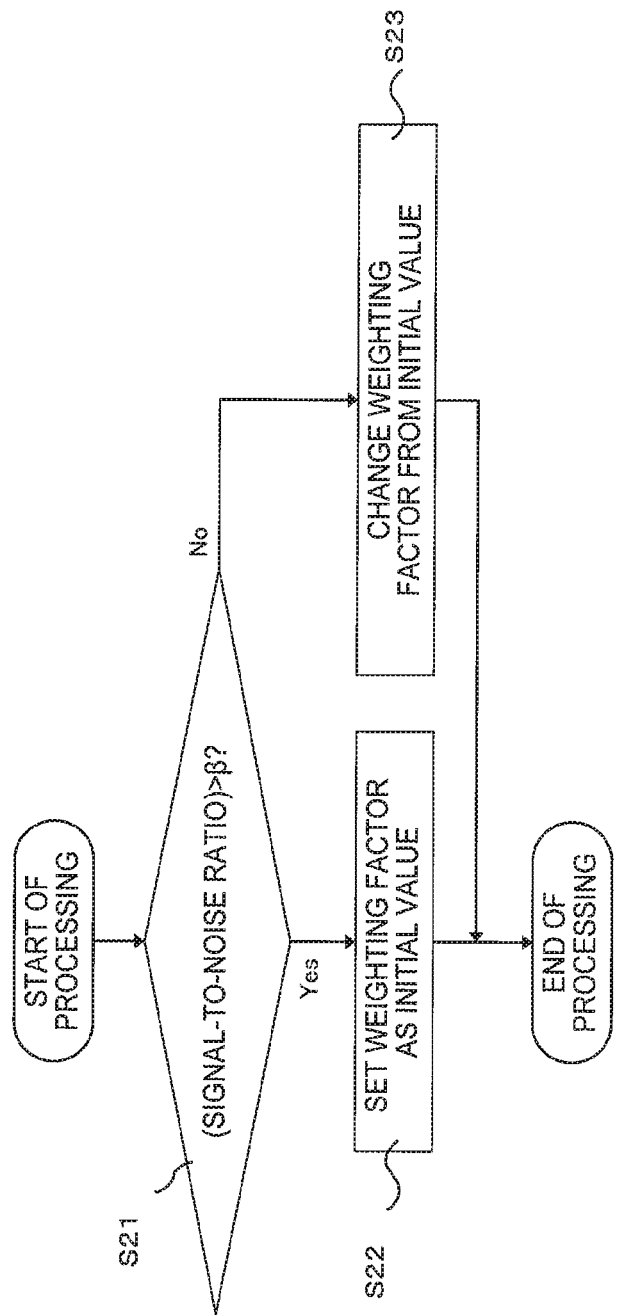
FIG. 7 is a flowchart for illustrating a series of operations conducted by an object determination processing control unit of the second embodiment of the present invention.

Next, the contents of the processing conducted by the object determination processing control unit 704 of the second embodiment are described with reference to a flowchart. FIG. 7 is a flowchart for illustrating a series of operations conducted by the object determination processing control unit 704 in the second embodiment of the present invention.

First, in Step S21, the object determination processing control unit 704 determines whether or not the signal-to-noise ratio detected by the signal-to-noise ratio calculation unit 706 is larger than a predetermined threshold value β.

When the signal-to-noise ratio is larger than the threshold value β (YES in FIG. 7), the object determination processing control unit 704 executes the processing of Step S22. Then, in Step S22, the object determination processing control unit 704 conducts processing for setting, to an initial value, a weighting factor to be multiplied by information to be used for type determination.

In this case, the initial value corresponds to a coefficient set in advance for each piece of information to be used for the type determination. The initial value of the weighting factor may be defined through an experiment or the like. Examples of the information to be used for the type determination include a maximum detection distance, the relative velocity, the received power, a change amount of the received power (in directions of distance and time), and wavenumber information on an arrival wave obtained by an arrival direction estimation method.

Meanwhile, when the signal-to-noise ratio is equal to or smaller than the threshold value β, the object determination processing control unit 704 executes the processing of Step S23. Then, in Step S23, the object determination processing control unit 704 conducts processing for changing the weighting factor to be multiplied by the information to be used for the type determination from the initial value.

After the object determination processing control unit 704 conducts the above-mentioned processing, the object determination unit 705 calculates, for each piece of information, a belonging degree with respect to a distribution of pieces of information to be used for the type determination of an object type, which is defined in advance, in relation to the information to be used for the type determination, which is obtained from the received signal of the reflected wave received from the object.

In addition, the object determination unit 705 determines the type (category) of the object based on a total sum value obtained by multiplying the calculated belonging degree by the weighting factor for each piece of information to be used for the type determination, which is set by the object determination processing control unit 704.

To be specific, in Step S23 described above, the following processing is conducted. For example, when the signal-to-noise ratio is equal to or smaller than the predetermined threshold value β, the object determination processing control unit 704 determines that the change amount (variations in terms of time and distance) of the received power, which is one of the pieces of information to be used for the type determination, is not the intrinsic variations of the signal ascribable to the object due to an influence of noise.

In view of this, the object determination processing control unit 704 reduces the weighting factor to be multiplied by the change amount (variations in terms of time and distance) of the received power from the initial value, and sets the initial value as the weighting factor to be multiplied by the other pieces of information to be used for the type determination. The threshold value β and the weighting factor are defined as appropriate values based on an analysis or an experiment in the same manner as in the first embodiment.

Figure 8:
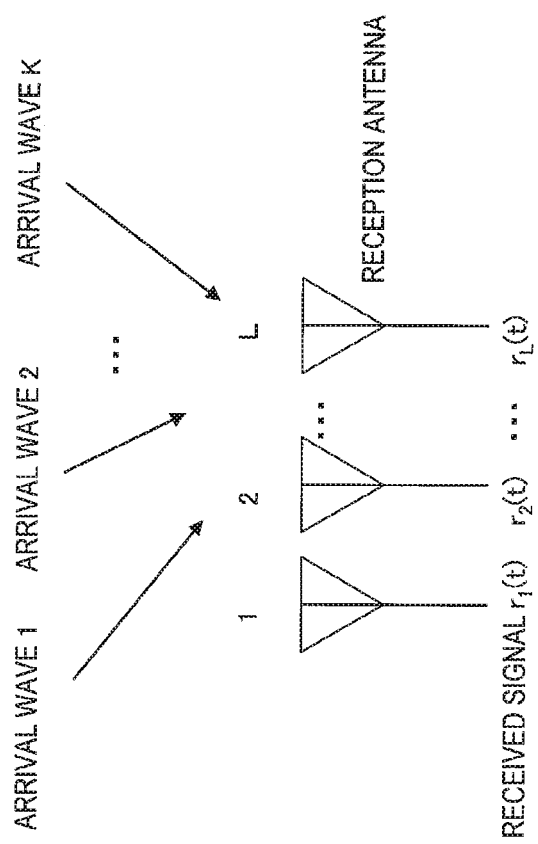
FIG. 8 is a diagram for illustrating a method of obtaining a signal eigenvalue and a noise eigenvalue in the second embodiment of the present invention.

Next, the method of obtaining the signal eigenvalue and the noise eigenvalue described above is described below. FIG. 8 is a diagram for illustrating the method of obtaining the signal eigenvalue and the noise eigenvalue in the second embodiment of the present invention.

Specifically, FIG. 8 is an illustration of a state under which received signals $r_1(t), r_2(t), \ldots,$ and $r_L(t)$ are observed by the respective receiving antennas when K arrival waves enter L receiving antennas. The received signals $r_i(t)$, $i=1, \ldots,$ and L observed by the respective receiving antennas can be expressed as Expression (1).

$$r_i(t) = \sum_{k=1}^{K} g_i(\theta) e^{-j\frac{2\pi f}{c} r_i} s_k(t) + n_i(t) \quad i = 1, 2, \ldots, L \quad (1)$$

In Expression (1), $S_k(t)$ represents a complex amplitude of the k-th arrival wave, $g_i(\theta)$ represents a gain of the i-th receiving antenna, and $n_i(t)$ represents additive noise (mainly, receiver noise) of the i-th receiving antenna. In the expression, the term expressed by an Euler number represents a phase lag that occurs at a position $r_i$ of the i-th receiving antenna with respect to the absolute coordinates at a frequency f of the transmission wave. In the expression, c represents light speed in a free space.

The received signals obtained by the L receiving antennas are expressed as Expressions (2) to (5) in a vector format. In the expressions, symbol "T" represents a transposition.

$$r(t) = As(t) + n(t) \quad (2)$$

$$r(t) = [r_1(t), r_2(t), \ldots, r_L(t)]^T \quad (3)$$

$$A = \begin{bmatrix} g_1(\theta_1)e^{-j\frac{2\pi f}{c}r_1} & \cdots & g_1(\theta_K)e^{-j\frac{2\pi f}{c}r_1} \\ \vdots & \ddots & \vdots \\ g_L(\theta_1)e^{-j\frac{2\pi f}{c}r_L} & \cdots & g_L(\theta_K)e^{-j\frac{2\pi f}{c}r_L} \end{bmatrix} \quad (4)$$

$$s(t) = [s_1(t), s_2(t), \ldots s_K(t)] \quad (5)$$

Next, when pieces of additive noise of the respective receiving antennas are uncorrelated to one another and are pieces of white noise exhibiting a dispersion σ, correlation matrices of the received signals are expressed as Expressions (6) to (9). In the expressions, E[ ] represents an ensemble average, and symbol "H" represents a complex conjugate transposition.

$$R_{rr} = E[r(t)r(t)^H] = R_S + R_N \quad (6)$$

$$R_S = ASA^H \quad (7)$$

$$S = E[s(t)s(t)^H] \quad (8)$$

$$R_N = E[n(t)n(t)^H] = \sigma^2 I \quad (9)$$

Next, a correlation matrix $R_{rr}$ expressed by Expression (6) is eigenvalue-expanded, to thereby obtain the eigenvalue. When the eigenvalue is represented by $\lambda_i$ and an eigenvector is represented by $e_i$, $R_{rr}e_i$ is expressed as Expression (10). In the expression, the correlation matrix $R_{rr}$ represents a Hermitian matrix in terms of its definition, and the eigenvalue $\lambda_i$ of the correlation matrix $R_{rr}$ satisfies the relationship of Expression (11) as a non-negative real number.

$$R_{rr}e_i = (ASA^H + \sigma^2 I)e_i = \lambda_i e_i \quad i=1,2,\ldots,L \quad (10)$$

$$\lambda_1 \geq \lambda_2 \geq \ldots \geq \lambda_L \geq 0 \quad (11)$$

The number K of arrival waves is less than the number of elements (K<L), and when the arrival waves are incoherent with each other (when the degree of a correlation coefficient is less than one), Expression (12) is established.

$$(ASA^H)e_i = (\lambda_i - \sigma^2)e_i = \zeta_i e_i \quad (12)$$

It is understood from Expressions (9) and (12) that ζi is a signal eigenvalue and $\sigma^2$ is a noise eigenvalue.

The above-mentioned assumption leads to RANK $(ASA^H) = K$, and hence the (K+1)-th eigenvalue and the subsequent eigenvalues are zero with the signal eigenvalue $\zeta_i$ satisfying the relationship of Expression (13).

$$\zeta_1 \geq \zeta_2 \geq \ldots \geq \zeta_K > \zeta_{K+1} = \ldots = \zeta_L = 0 \quad (13)$$

The relationships of Expressions (11), (12), and (13) cause the eigenvalue $\lambda_i$ of the correlation matrix $R_{rr}$ to satisfy the relationship of Expression (14).

$$\lambda_1 \geq \lambda_2 \geq \ldots \geq \lambda_K > \lambda_{K+1} = \ldots = \lambda_L = \sigma^2 \quad (14)$$

As described above, the eigenvalue of the correlation matrix $R_{rr}$ can be expressed as Expression (15).

$$\lambda_i = \begin{cases} \zeta_i + \sigma^2 & i = 1, 2, \ldots, K \\ \sigma^2 & i = K+1, \ldots, L \end{cases} \quad (15)$$

Figure 9:
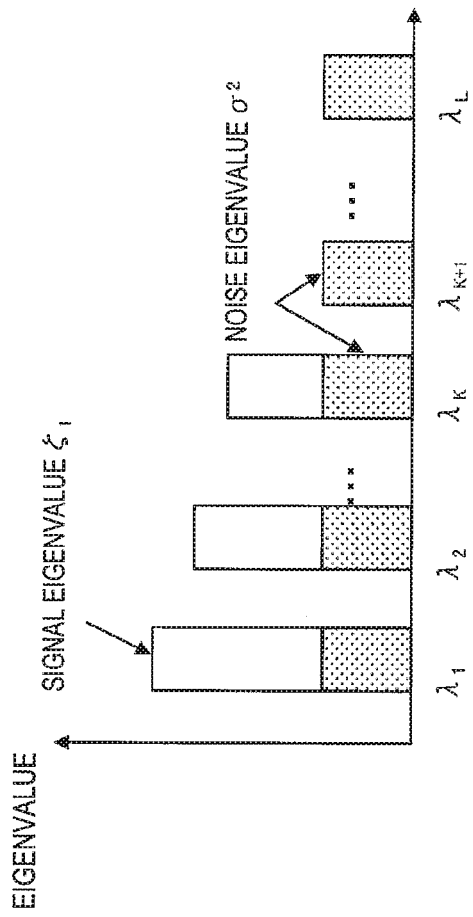
FIG. 9 is a graph for showing a distribution of eigenvalues in the second embodiment of the present invention.

FIG. 9 is a graph for showing a distribution of eigenvalues in the second embodiment of the present invention. In the distribution of eigenvalues, as shown in FIG. 9, the eigenvalue with i≤K is a sum of the signal eigenvalue and the noise eigenvalue, and the eigenvalue with K+1≤i≤L is only the noise eigenvalue.

Therefore, the signal-to-noise ratio based on the signal eigenvalue and the noise eigenvalue of the correlation matrix $R_{rr}$ are derived from Expression (15) as Expression (16) and Expression (17).

$$\text{signal-to-noise ratio based on eigenvalues} = \frac{\lambda_i - \sigma^2}{\sigma^2} \quad (16)$$

$$\sigma^2 = \frac{\sum_{i=K+1}^{L} \lambda_i}{L - (K+1)} \quad (17)$$

In order to calculate the signal-to-noise ratio, it is also possible to simultaneously calculate a signal-to-noise ratio obtained from the frequency spectrum and a signal-to-noise ratio obtained from the signal eigenvalue and the noise eigenvalue of the correlation matrix, and to determine by the object determination processing control unit 704 whether or not both the signal-to-noise ratios are larger than a predetermined threshold value.

For example, even when the signal-to-noise ratio obtained from the eigenvalue is small while the signal-to-noise ratio obtained from the frequency spectrum is large, the object determination processing control unit 704 can determine that the influence of noise is large and can reduce the weighting factor to be used for the type determination. As an example in which such a phenomenon occurs, objects exhibiting the same distance and the same relative velocity exist at different angles.

Further, the object determination processing control unit 704 may control the weighting factor so as to become larger only when a signal-to-noise power ratio obtained from the frequency spectrum is large and a signal-to-noise power ratio obtained from the eigenvalue is large.

In this manner, a plurality of signal-to-noise power ratios are combined to set the weighting factor, to thereby be able to more finely set the threshold value and the weighting factor based on a state of being reflected by the object than when the signal-to-noise power ratio is obtained by only any one of methods to set the weighting factor. As a result, it is possible to conduct the type determination with higher precision.

As described above, a radar signal processing device according to the second embodiment further includes a signal-to-noise ratio calculation unit in addition to the configuration of the first embodiment, and is configured to set the weighting factor from the signal-to-noise power ratio. As a result, in the same manner as in the first embodiment, it is possible to obtain a radar signal processing device capable of conducting the type determination of the object more accurately than the related-art radar signal processing device.

It is also possible to integrally form the signal-to-noise ratio calculation unit 706 and the object determination processing control unit 704 to provide the function of the signal-to-noise ratio calculation unit 706 to the object determination processing control unit 704.

What is claimed is:

1. A radar signal processing device, comprising:
   a transmitter configured to transmit a transmission wave to an object;
   a receiver configured to acquire a received signal based on a reflected wave from the object;
   a peak frequency power spectrum detector configured to detect information to be used for type determination of the object from the received signal acquired by the receiver;
   an object category classifier configured to determine a type of the object based on the information detected by the detector unit; and
   a control unit configured to identify a weighting factor set for each piece of the information to be used for the type determination of the object depending on a characteristic of the received signal acquired by the receiver,
   wherein the object category classifier is configured to obtain a total sum value by multiplying the corresponding weighting factor identified by the control unit for each piece of the information detected by the peak frequency power spectrum detector, and to sum the multiplication products to determine the type of the object based on the total sum value.

2. A radar signal processing device according to claim 1, wherein the control unit is configured to calculate a signal intensity of the received signal as the characteristic of the received signal, and to change setting from an initial value of the weighting factor set in advance when a level of the signal intensity is equal to or lower than a first threshold value set in advance, to thereby identify the weighting factor.

3. A radar signal processing device according to claim 1, wherein the control unit is configured to calculate a signal-to-noise ratio of the received signal as the characteristic of the received signal, and to change setting from an initial value of the weighting factor set in advance when a level of the signal-to-noise ratio is equal to or lower than a second threshold value set in advance, to thereby identify the weighting factor.

4. A radar signal processing device according to claim 3, wherein the control unit is configured to calculate the signal-to-noise ratio through use of a signal and noise that are obtained from a frequency spectrum of the received signal.

5. A radar signal processing device according to claim 3, wherein the control unit is configured to calculate, when the received signal is received through a plurality of receiving antennas, the signal-to-noise ratio through use of a signal eigenvalue and a noise eigenvalue that are obtained from a correlation matrix of the received signal.

6. A radar signal processing device according to claim 1, wherein the control unit is configured to change the weighting factor to be identified in a stepwise manner through use of a plurality of threshold values set for the characteristic of the received signal in advance.

7. A radar signal processing device according to claim 2, wherein the control unit is configured to change the weighting factor to be identified in a stepwise manner through use of a plurality of threshold values set for the characteristic of the received signal in advance.

8. A radar signal processing device according to claim 3, wherein the control unit is configured to change the weighting factor to be identified in a stepwise manner through use of a plurality of threshold values set for the characteristic of the received signal in advance.

9. A radar signal processing device according to claim 4, wherein the control unit is configured to change the weighting factor to be identified in a stepwise manner through use of a plurality of threshold values set for the characteristic of the received signal in advance.

10. A radar signal processing device according to claim 5, wherein the control unit is configured to change the weighting factor to be identified in a stepwise manner through use of a plurality of threshold values set for the characteristic of the received signal in advance.

* * * * *